3,248,392
STEROID LACTONES AND PROCESS
Roy L. Evans, deceased, late of Evansville, Ind., by Barbara Faith Evans, administratrix, Evansville, Ind., and Homer E. Stavely, Evansville, Ind., assignors to Mead Johnson & Company, Evansville, Ind., a corporation of Indiana
No Drawing. Filed May 21, 1964, Ser. No. 370,396
20 Claims. (Cl. 260—239.57)

The present invention is concerned with a new class of steroid lactone compounds and with processes for their preparation. More particularly it concerns testosterone derivatives having the following formula in which R is hydrogen or a lower alkanoyl group having from one to six carbon atoms such as acetyl, propionyl, butyryl, or caproyl, and R' is hydrogen or methyl.

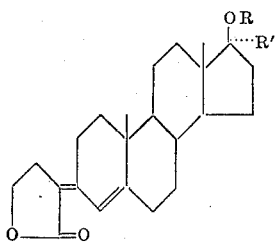

Formula I

The substituent group in the 3-position of the compounds of Formula I is a key structural feature of these products. This substituent group is shown separately below as Formula II. It is referred to as the γ-butyrolacton-α-ylidene group. The substituent group shown in Formula III which is found in a related group of products of this invention described hereinafter is referred to as the γ-butyrolacton-α-yl group. These substituent groups constitute characteristic features of the structures of each of the steroid lactones of the present invention.

 

Formula II     Formula III

Typical products of Formula I are 3-(γ-butyrolacton-α-ylidene)-17β-acetoxyandrost-4-ene, 3-(γ-butyrolacton-α-ylidene)androst - 4 - ene - 17β - ol, 3 - (γ-butyrolacton - α-ylidene)-17β-propionoxyandrost-4-ene, and 3-(γ-butyrolacton-α-ylidene)-17β-hydroxy-17α-methylandrost-4-ene.

The substances of Formula I are of value for their biological properties and utility as intermediates. For example, 3 - (γ - butyrolacton - α - ylidene) - 17β - acetoxyandrost-4-ene has been found to have an exceedingly high ratio of antiestrogenic activity to androgenic activity. The use of presently available anti-estrogens suffers from side effects stemming from the androgenic activity thereof.

3 - (γ - butyrolacton - α - ylidene) - 17β - acetoxyandrost-4-ene approaches testostreone as an antagonist of the uterotropic effect of estrone in the mouse according to the method of Dorfman and Kincl, Steroids, vol. 1, page 185 (1963). This method employs three groups of weaning female mice, two of which were treated subcutaneously with estrone in oil daily for three days. One of the two groups receiving estrone also received a daily subcutaneous injection of the test compound. A third group received only the oil vehicle daily. On the fourth day all mice were weighed, sacrificed, and the uteri excised and weighed. The degree of antiestrogenic activity was reflected by the lower uterine weight of the mice which were treated with the test compound.

Androgenic activity of the test compounds, as compared to testosterone, was measured in weaning male rats according to the method of Hershberger, Proc. Soc. Exp. Biol., New York, vol. 83, page 175 (1963). 3-(γ-butyrolacton - α - ylidene)-17β-acetoxyandrost-4-ene was found to have approximately 1/1000 the activity of testosterone.

The compounds of Formula I are prepared by treatment of testosterone, 17α-methyltestosterone, or one of their 17β-lower alkanoyl esters having one to six carbon atoms with an α-halo-γ-butyrolactone in a reaction inert organic solvent with an equivalent amount (relative to the halobutyrolactone) of zinc or magnesium. α-Bromo-γ-butyrolactone, α-chloro-γ-butyrolactone, and α-iodo-γ-butyrolactone are operable. Suitable solvents include benzene, ether, dibutyl ether, toluene, xylene, etc. The reaction is carried out under the conditions ordinarily employed for the Reformatsky reaction (see "Organic Reactions," vol. I, John Wiley & Sons, Inc., New York, 1942, chapter 1). These conditions involve adding a solution of the ketone and the α-halo-γ-butyrolactone to a suspension of zinc dust, zinc foil, granulated or mossy zinc, and heating the resulting mixture at about 50–150° C. Corresponding amounts of magnesium may also be employed, but zinc is preferred.

The preferred solvent is a mixture of ether and benzene. The preferred halobutyrolactone is α-bromo-γ-butyrolactone. Ordinarily the reaction is carried out at the reflux temperature of the reaction medium, although cooling may be required at the outset to control the initial exothermic reaction. The product is recovered by treatment of the reaction mixture at room temperature with aqueous acid such as 2 N hydrochloric acid to decompose the insoluble reaction complex. The organic layer is then removed and the product recovered by a suitable technique such as evaporation or crystallization.

The product recovered at this stage is usually a mixture containing principally the hydroxyl compound of Formula IV in which R and R' have the same meaning as above. The configurations of the hydroxyl and the γ-butyrolactone-α-yl groups have not been established. It is intended to include within the scope of the invention both configuration; i.e. where the 3-OH is in either the α, or β-configuration. The compounds of Formula IV are of value on account of their biological properties and for the preparation of biologically active steroid end products including the products of Formula I.

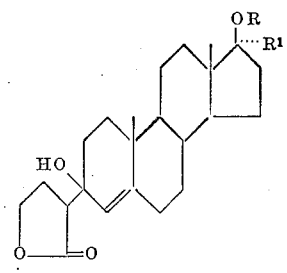

Formula IV

The hydroxyl compound of Formula IV is transformed into the product of Formula I by methods applicable to the dehydration of tertiary alcohols such as treatment with an acidic dehydrating agent, for instance a mineral acid or hydrocarbon sulfonic acid dissolved in an anhydrous organic solvent. A preferred dehydrating agent is p-toluenesulfonic acid dissolved in benzene. The hydroxyl compound is simply heated at reflux with the dehydrating agent for several hours, during which time the water eliminated is removed by distillation of the benzene-water azeotrope.

When preparing compounds of Formula I, it is not always convenient to isolate and purify the intermediate of Formula IV. Rather the crude intermediate can sometimes be treated directly with the dehydrating agent for the production of the substance of Formula I. In other instances an affirmative dehydration step is not required, the aqueous acid treatment involved in decomposing the metal complex resulting from the Reformatsky step being sufficient to effect dehydration. The intermediates of Formula IV may be isolated and purified if desired, however. For instance, when such compound has desirable biological properties and is useful as a medicinal agent, isolation and purification is recommended.

It has been found that the above processes are of general applicability to ketosteroids where the keto group is not sterically hindered, and it is intended to include within the scope of this invention the broad application of the Reformatsky condensation of α-halo-γ-butyrolactones with ketosteroids in which the keto group is sterically free.

As is understood in the art, the term sterically free or sterically unhindered refers to keto groups which are not spatially blocked by other portions of the perhydrocyclopentanophenanthrene ring structure or substituents thereon. For instance, it is known that keto groups in the 3-, 16-, and 17-positions of the androstane nucleus are exposed and thus reactive with carbonyl reagents such as 2,4-dinitrophenylhydrazine, hydroxylamine, phenylhydrazine, or Girard's reagent, while keto groups such as those in the 11- or 12-position are hindered and thus unreactive.

From measurements of the Dreiding models of the various ketosteroids that have been treated according to the present process, it has been concluded that those ketosteroids in which the ketone carbon atom is separated by a distance of 2.8 A. or less from any other carbon of the steroid structure are inoperative except for the D-ring ketosteroids of the perhydrocyclopentanophenanthrene series. The latter, that is the $C_{15}$, $C_{16}$, and $C_{17}$ ketosteroids, are reactive with the α-halo-γ-butylrolactones according to the present process. The fact that the D-ring ketosteroids are reactive despite the somewhat greater degree of steric hindrance than is found in certain of the non-reactive ketosteroids of the type referred to above is an exception which may be related to the fact that the D-ring is a 5-membered ring and therefore somewhat strained. To illustrate the way in which the above rule applies, 3β-acetoxypregn-5-ene-20-one fails to react with zinc and α-bromo-γ-butyrolactone while 3β-acetoxypregn-5,16-diene-20-one reacts under the same conditions to provide a satisfactory yield of 3β-acetoxy-20-(γ-butyrolacton-α-yl)pregn-5,16-diene-20-ol as is illustrated in Example 8. The former has a $C_{18}$–$C_{20}$ atomic distance of 2.8 A., while the latter has a $C_{18}$–$C_{20}$ atomic distance of 3.4 A.

As with the testosterone derivatives of Formulas I and IV above, the products of the present invention may be broadly defined as falling into two classes. The first class of compounds are analagous in structure to those of Formula IV, and comprise hydroxyl substituted steroids bearing the γ-butyrolacton-α-yl group attached to the same carbon atom as the hydroxyl group. This functional arrangement occurs in that position of the steroid product which corresponds to the position of the sterically free keto group of that keto steroid of structure otherwise analagous to that of the product.

The second class of products comprises those steroids having the γ-butyrolacton-α-ylidene group in that position of the steroid nucleus occupied by the keto oxygen atom of the sterically-free keto steroid of structure analagous to that of the product. These products are the dehydration products of the hydroxyl compounds described in the preceding paragraph.

Preferred compounds of the present invention include the γ-butyrolacton-α-yl hydroxy analogs and the γ-butyrolacton-α-ylidene analogs of the ketoandrostanes in which these functional groups are located in the 3-, 6-, or 17-positions; the ketopregnanes in which these functional groups are located in the 3- or 6-positions and the ketopregn-16-enes in which these functional groups are located in the 3-, 6-, or 20-positions. The 20-(γ-butyrolacton-α-yl)pregnan-20-ols and the 20-(γ-butyrolacton-α-ylidene) pregnanes are also members of the preferred class. They are prepared by hydrogenation of their $Δ^{16}$ counterparts. Reference to the term androstane and pregnene in describing the generic class of compounds of the present invention is not intended to be limiting to those hydrocarbons per se, but is rather used in a generic sense as referring to all steroids having those ring structures and which bear saturated or unsaturated linkages or substituent groups such as alkyl, alkoxy, hydroxy, halogen, sterically hindered keto groups such as those in the 11- or 12-positions, etc.

The γ-butyrolacton-α-ylidene steriods and the γ-butyrolacton-α-yl hydroxysteroids of the present invention are of value on account of their biological properties and as intermediates in the preparation of other steroids with useful biological properties. As intermediates they may be transformed into other steroid products by processes including catalytic hydrogenation, dehydration, isomerization by treatment with acid or alkali, or hydrolysis. Relative to the latter, the butyrolactone ring is readily opened by alkaline hydrolysis in dilute aqueous solution. The resulting steroid substituted hydroxypentanoic acid may then be transformed into other derivatives by operation on either the carboxyl or hydroxyl group to provide amides, esters, halides, etc. by adaption of conventional means.

It has been found that on dehydration of some of the present γ-butyrolacton-α-yl hydroxy steroids an unsaturated steroid product is obtained in which the double bond occurs in the ring structure adjacent to the γ-butyrolacton-α-yl group rather than in the exocyclic configuration characteristic of the γ-butyrolacton-α-ylidene products of which Formula I is an example. This condition can be detected when it occurs by measurement of the ultraviolet absorption spectrum of the product. The γ-butyrolacton-α-ylidene products (exocyclic carbon-carbon double bond) exhibit low intensity absorption of the ultraviolet light at 220–240 mμ, as is characteristic of α,β-unsaturated carbonyl compounds. In those examples where an additional carbon-carbon double bond is conjugated with the lactone carbonyl as in Formula I, a bathochromic shift to about 280–300 mμ occurs and the absorption is more intense. The absence of ultraviolet absorption in either of these regions coupled with evidence that dehydration has in fact occurred, is indicative of formation of a steroid product in which the carbon-carbon unsaturation occurs in the ring, i.e. not in conjugation with the lactone carbonyl group. The absence of hydroxyl absorption in the infrared spectrum, or the carbon and hydrogen analysis of the product may serve as criteria for dehydration.

The foregoing endocyclic unsaturated steroid lactones also have utility as indicated above and are considered part of the present invention. These substances correspond in structure to a ketosteroid having a sterically-free ketone group in which the endocyclic carbon-carbon double bond and the γ-butyrolacton-α-yl group are each attached to the carbon atom of the sterically-free keto group. A specific example where this has been observed is in reaction of cholestan-3-one with α-bromo-γ-butyrolactone in the presence of zinc as described hereinafter. The resulting hydroxyl intermediate on dehydration yielded a mixture containing 3-(γ-butyrolacton-α-yl)cholest-2-ene as major component.

The following examples are provided to illustrate the specific application of the general process of the present invention to a number of specific examples, and also to illustrate the preparation of specific compounds of the present invention. Various modifications of the reaction conditions described may be made, as will be apparent to those skilled in the art.

EXAMPLE 1

3-(γ-butyrolacton-α-yl)cholestan-3-ol

A quantity of zinc is freshly activated by treatment with hydrochloric acid and washing with water, alcohol, acetone, and ether, then drying in an oven at 100° C. for 10 minutes. A portion thereof weighing 1.3 g. is then covered with benzene in a reaction flask equipped for exclusion of atmospheric moisture. An iodine crystal is added and a solution containing 3.87 g. of cholestan-3-one and 2.34 g. of α-bromo-γ-butyrolactone in 22 ml. of benzene is added dropwise during a period of 40 min. The reaction vessel is heated during this period to maintain the reaction mixture at reflux. Heating is continued for an additional 3 hrs. after the solution has been added. Midway during this period an additional 0.6 g. of activated zinc is added to the reaction mixture. The precipitate of the zinc-containing reaction complex which forms is decomposed following the heating period by treatment of the reaction mixture with 40 ml. of 2 N hydrochloric acid. Additional benzene is added to the resulting mixture if needed to dissolve all organic material. The benzene layer is then separated and the solvent removed by distillation. The resulting residue is triturated with boiling ether, collected, and crystallized from ethanol, M.P. 174–176° C. The infrared absorption spectrum (0.5% in KBr) contains absorption bands at 2.92, 5.72, 8.55, and 9.72μ, characteristic of hydroxyl and carbonyl absorption attributable to the hydroxyl and γ-butyrolacton-α-yl groups.

Analysis.—Calcd. for: $C_{31}H_{52}O_3$: C, 78.76; H, 11.09; O, 10.15. Found: C, 78.93; H, 11.24; O, 10.14.

EXAMPLE 2

Dehydration of 3-(γ-butyrolacton-α-yl)-cholestan-3-ol

A solution of 0.03 g. of p-toluenesulfonic acid and 0.3 g. of the product of Example 1 is dissolved in 15 ml. of benzene and the solution is placed in a flask fitted with a Dean-Stark trap and reflux condenser. The solution is heated at reflux until separation of water is complete, approximately 3 hrs. being required. The solution is allowed to cool, washed with dilute sodium bicarbonate solution, water, and dried prior to distillation of the solvent. The residue is crystallized from ether yielding the purified product, M.P. 173–175° C. The infrared absorption band observed at 2.92μ for the starting material was found to be absent from the spectrum of product indicating that dehydration had occurred. Other bands were present at 5.67, 6.10, 6.82, 7.30, 8.28, 8.68 and 9.76μ (0.5% in KBr). Absorption in the ultraviolet region of the spectrum occurred at about 220 mμ when measured on a solution having 0.01% concentration in ethanol. These facts were indicative of the formation of a mixture of endocyclic and exocyclic unsaturated products. The nuclear magnetic resonance spectrum of a 10% solution of the product in chloroform containing 3% of tetramethylsilane was measured with a Varian A–60 NMR Spectrometer operated at 60 mc. Resonating frequencies relative to tetramethylsilane was observed at 339 c.p.s. (5.65 p.p.m.), characteristic of the vinyl proton of the $\Delta^2$ isomer and at 260 c.p.s. (4.33 p.p.m.) characteristic of the γ-protons of the γ-butyrolactone substituent. Integration at these frequencies and formation of a ratio of the former to the latter gave 0.7/2.0 which indicated that the sample contained 70% of 3-(γ-butyrolacton-α-yl) cholest-2-ene and 30% of 3-(γ-butyrolacton-α-ylidene) cholestane.

EXAMPLE 3

17β-acetoxy-3-(γ-butyrolacton-α-yl)androst-4-ene-3-ol

A solution of 3.30 g. (0.01 mole) of testosterone acetate in 20 ml. of 1:1 ether-benzene is mixed with 10 g. of freshly activated zinc powder and a few iodine crystals. A solution of 4.68 g. (0.026 mole) of α-bromo-γ-butyrolactone in the same solvent mixture is added in dropwise fashion during a period of 35 min. to the above solution. The mixture is then refluxed for 3 hrs. with the formation of a turbid suspension. The cooled reaction mixture is then treated with 40 ml. of 2 N hydrochloric acid and 40 ml. of benzene. The organic layer is separated, washed, dried, and the solvent removed. A solid residue somewhat yellow in color is obtained. The infrared and ultraviolet absorption spectra of the crude product indicates it to be a mixture of 17β-acetoxy-3α-(γ-butyrolacton-α-yl)androst-4-ene-3-ol and 17β-acetoxy-3-(γ-butyrolacton-α-ylidene)androst-4-ene.

EXAMPLE 4

17β-acetoxy-3-(γ-butyrolacton-α-ylidene)androst-4-ene

The product of Example 3 is treated in the fashion described in Example 2 resulting in the desired product which is recrystallized from ether, M.P. 180–182° C. $[\alpha]_D^{25}$ +149.3° (c. 1%, $CHCl_3$); $\lambda_{max.}$ 213 mμ, ε=27,000 (c. 0.001% ethanol); infrared absorption maxima, 3.44, 5.78, 6.18, 6.94, 7.30, 8.0, 8.28, 8.39, 9.18, and 9.63μ (0.5% in KBr pellet).

Analysis.—Calcd. for: $C_{25}H_{34}O_4$: C, 75.34; H, 8.60; O, 16.06. Found: C, 75.60; H, 8.46; O, 16.23.

EXAMPLE 5

3-(γ-butyrolacton-α-ylidene)pregn-4-ene-20-one

Freshly activated zinc powder, 20 g., is suspended in a solution of 6.30 g. (0.02 mole) of progesterone dissolved in 50 ml. of 1:1 benzene-ether and a crystal of iodine is added to the mixture. This mixture is then treated in a dropwise fashion with a solution of 9.4 g. (0.052 mole) of α-bromo-γ-butyrolactone in the same solvent mixture during a period of 40 min. The reaction mixture is refluxed for 3 hrs. and the crude product recovered after decomposition of the reaction complex with aqueous 2 N hydrochloric acid, as in Example 1. The crude product contains a significant amount of 3-(γ-butyrolacton-α-yl) pregn-4-en-3-ol-20-one. It is removed by recrystallization from ethyl acetate and then from ether yielding 3-(γ-butyrolacton-α-ylidene)pregn-4-en-20-one, M.P. 182–184° C. The infrared absorption spectrum of the product exhibits no absorption band at 2.9μ, which is characteristic of the hydroxyl group of the intermediate pregnan-3-ol, $\lambda_{max.}$, 293 mμ, ε=27,300 (c. 0.001%, ethanol). Infrared absorption maxima are exhibited at 3.42, 5.78, 6.17, 8.26, 8.40, 9.38, 9.67μ (0.5% in KBr pellet).

Analysis.—Calcd. for $C_{25}H_{34}O_3$: C, 78.49; H, 8.96; O, 12.55. Found: C, 78.13; H, 8.83; O, 12.41

EXAMPLE 6

17-(γ-butyrolacton-α-yl)androst-5-ene-3β,17-diol 3β-acetate

Dehydroisoandrosterone acetate, 6.6 g., is allowed to react in substantially the fashion described in Example 1 with proportionate quantities of zinc and α-bromo-γ-butyrolactone. The crude product is separated by chromatography on an alumina column developed with a benzene-ether solvent mixture to yield pure, unreacted starting material and the desired product in pure condition, M.P. 205–207° C. The substance exhibits infrared absorption maxima at 2.91, 5.76, 7.28, 8.0, 8.30 and 9.72μ (c. 10% in $CHCl_3$), but does not exhibit any significant absorption in the ultraviolet. $[\alpha]_D^{25}$ 49.6° (c. 1%, $CHCl_3$).

Analysis.—Calcd. for $C_{25}H_{36}O_5$: C, 72.08; H, 8.71; O, 19.21. Found: C, 72.05; H, 8.68; O, 19.05.

EXAMPLE 7

17-(γ-butyrolacton-α-yl)androst-5-ene-3β,17-diol

The product of Example 6 is warmed with two molecular equivalents of potassium hydroxide in methanol. After standing overnight, water is added. The solution is acidified with hydrochloric acid and extracted with ether. The residue, after evaporation of the ether, is recrystallized from aqueous alcohol, M.P. 208–210° C.

*Analysis.*—Calcd. for $C_{23}H_{34}O_4$: C, 73.96; H, 9.15; O, 17.09. Found: C, 73.20; H, 8.85; O, 16.90.

EXAMPLE 8

*3β-acetoxy-20-(γ-butyrolacton-α-yl)pregn-5,16-diene-20-ol*

16-dehydropregnenolone acetate, 7.13 g., is allowed to react with zinc and α-bromo-γ-butyrolactone in the proportions and according to the conditions described in Example 1. The crude product is recovered as described in that example and chromatographed on a silica gel column 1″ x 22″ developed with 1:9 ether-benzene to yield a main fraction, M.P. 190° C. This fraction is then chromatographed on acid washed alumina, and the column developed with benzene and ether, yielding the desired product which is crystallized from ether, M.P. 193–195° C. $[\alpha]_D^{25} = -62.5°$ (c. 1% $CHCl_3$).

This substance exhibits no significant ultraviolet absorption and infrared absorption bands at 2.92, 5.78, 7.30, 8.02, 8.44, 8.92, and 9.70μ. (5% in KBr pellet).

EXAMPLE 9

*3β-acetoxy-20-(γ-butyrolacton-α-yl)pregn-5-ene-20-ol*

The product of Example 8 is hydrogenated in ethanolic solution over a 5% palladium-on-carbon hydrogenation catalyst. One molecular equivalent of hydrogen is readily absorbed. The crude product exhibits M.P. 219–225° C.

EXAMPLE 10

*3-(γ-butyrolacton-α-ylidene)-17α-hydroxy-11-dehydrocorticosterone-21-acetate*

Cortisone acetate, 4.0 g., is subjected to the Reformatsky reaction with zinc and α-bromo-butyrolactone as described in Example 1. The product exhibits an ultraviolet absorption maxima at 240 mμ and 280 mμ, which is consistent with formation of a mixture of the desired product and unreacted starting material.

EXAMPLE 11

*17β-acetoxy-3-(γ-butyrolacton-α-ylidene)-17α-methylandrost-4-ene*

17α-methyltestosterone acetate, 9.0 g., is allowed to react with the zinc and α-bromo-γ-butyrolactone according to the conditions specified in Example 1. The product is recrystallized from ether, M.P. 205–210° C. A mixture of 17β-acetoxy-3-(γ-butyrolacton-α-yl)-17α-methylandrost-4-en-3-ol and 17β-acetoxy-3-(γ-butyrolacton-α-ylidene)-17α-methylandrost-4-ene as indicated by the existence of infrared absorption at 2.95μ characteristic of the 3-OH and at 295 mμ in the ultraviolet characteristic of the carbonyl-conjugated diene system of the lactonylidene substituent in the 3-position. The mixture was separated by chromatography on alumina to yield purified 17β-acetoxy-3-(γ-butyrolacton-α-ylidene)-17α-methylandrost-4-ene, M.P. 222–5° C.; $\lambda_{max}$. 295 mμ, $\epsilon$=25,800 (c. 0.001%, $C_2H_5OH$); infrared absorption maxima at 3.42, 5.78, 6.18, 7.30, 7.92, 8.28, 8.37, 9.34, 9.52, and 9.67μ. (0.5% in KBr).

*Analysis.*—Calcd. for $C_{26}H_{36}O_4$: C, 75.69; H, 8.80; O, 15.51. Found: C, 75.48; H, 8.98; O, 15.38.

EXAMPLE 12

*17β-acetoxy-3-(γ-butyrolacton-α-yl)-17α-methylandrostan-3-ol*

17α-methyldihydrotestosterone acetate, 4.84 g., is subjected to the reaction described in Example 1 with zinc in α-bromo-γ-butyrolactone. The crude product is separated into various fractions by chromatography on an acid washed alumina column ¾″ x 12″ developed with benzene and ether. Those fractions exhibiting $[\alpha]_D^{25}$ in the range +9° to +12° are combined, the solvent evaporated, and the residue crystallized from ethanol, M.P. 226–229°C. Infrared absorption maxima are exhibited at 2.92, 5.70, 6.92, 7.30, 7.87, 8.15, 8.68, 9.89μ. (c. 10% in $CHCl_3$).

*Analysis.*—Calcd. for $C_{26}H_{40}O_5$: C, 72.19; H, 9.32; O, 18.49. Found: C, 71.92; H, 9.39; O, 18.21.

EXAMPLE 13

*Dehydration of 17β-acetoxy-3-(γ-butyrolacton-α-yl)-17-methylandrostan-3-ol*

The crude dehydration product is formed by treatment of the product of Example 12 by the procedure of Example 2, M.P. 100–110° C. This product exhibits infrared absorption at 5.76 and 8.4μ (Nujol mull) and no significant ultraviolet absorption. The product was concluded to be 17β-acetoxy-3-(γ-butyrolacton-α-yl)-17α-methylandrost-2-ene, its $\Delta^3$ isomer, or a mixture of the two.

EXAMPLE 14

*Use of magnesium as condensing agent*

The procedure of Example 3 is repeated substituting molecularly proportionate amounts of magnesium turnings and α-chloro-γ-butyrolactone as reactants with testosterone acetate. The product is obtained in somewhat lower yield, but on dehydration thereof according to Example 4, 17β-acetoxy-3-(γ-butyrolacton-α-ylidene)-androst-4-ene is obtained.

EXAMPLE 15

*17β-caprooxy-3-(γ-butyrolacton-α-ylidene)androst-4-ene*

The procedures of Examples 3 and 4 are repeated, substituting testosterone caproate as starting material.

EXAMPLE 16

*17β-hydroxy-3-(γ-butyrolacton-α-ylidene)androst-4-ene*

17β - acetoxy - 3 - (γ-butyrolacton-α-ylidene)androst-4-ene is submitted to the hydrolysis procedure of Example 7, resulting in formation of the desired product.

An alternate process for the preparation of the γ-butyrolacton-α-ylidene products of the present invention involves application of the Wittig reaction to a sterically-free ketosteroid and an α-dilower alkylphosphono-γ-butyrolactone of Formula V wherein R″ is a lower alkyl group of from one to six carbon atoms.

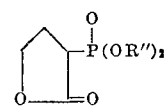

Formula V

The reaction is carred out under conditions known to the art for the Wittig reaction with dialkylphosphono reactants such as triethyl phosphonoacetate. These conditions involve reaction of the ketosteroid with at least equimolar proportions of a strong base such as an alkali metal hydride, alkoxide, or amide, including sodium hydride, sodium methoxide, sodium ethoxide, potassium t-butoxide, sodium amide, or lithium amide, and the α-dialkylphosphono-γ-butyrolactone reactant. A suitable reaction inert organic solvent is employed, such as ethylene glycol dimethyl ether. Other non-hydroxylic oxygenated solvents including other glycol ethers, cyclic ethers, and simple aliphatic ethers may be used. Reaction is complete after a short heating period of about 30 min. to 3 hrs. at a temperature of about 60–100° C. It is generally more convenient to mix the base and the α-dialkylphosphono-γ-butyrolactone and to then add the sterically-free ketosteroid reactant to this mixture. The following examples are provided to illustrate the application of this process to the preparation of the present compounds.

EXAMPLE 17

α-Diethylphosphono-γ-butyrolactone

A solution made up of 98 g. of α-bromo-γ-butyrolactone and 98 g. of triethyl phosphite is mixed and warmed to about 70° C., whereupon the clear solution becomes turbid. Vigorous ebulition due to vaporization of by-product ethyl bromide occurs as the temperature is increased to 125° C. The evolved ethyl bromide is removed by distillation and heating is continued at 180–185° C. for an additional hour. During this period 50 ml. of ethyl bromide distillate is collected. The apparatus is then arranged for vacuum distillation. The fore fraction, boiling at 50–60° C./0.7 mm. is discarded and the desired product is collected, B.P. 140-142° C./0.7 mm.

EXAMPLE 18

3-(γ-butyrolacton-α-ylidene) cholestane and 3-(γ-butyrolacton-α-yl) cholest-2-ene α-Diethyl phosphono-γ-butylrolactone, 3.64 g. (0.0164 mole), is carefully mixed with 0.02 mole of sodium hydride (supplied as a 54% suspension in mineral oil) contained in 35 ml. of dry dimethoxyethane. After 1 hr., 6.3 g. (0.0164 mole) of cholestane-3-one is added and the mixture is heated at 70° C. for 1.5 hrs. A red-colored precipitate forms. On conclusion of the heating period, cold water is added to the reaction mixture, and it is extracted with chloroform. The solvent is removed by distillation, and the residue recrystallized from ethanol to yield a product mixture similar to that obtained in Example 2.

EXAMPLE 19

3-(γ-butyrolacton-α-ylidene)-17α-methyl-androstan-17α-ol

α-(diethylphosphono)-γ-butylrolactone, 2.22 g., is added to a suspension of 0.50 g. of sodium hydride in 25 ml. of dimethoxyethane. The mixture is agitated for 1 hr. at room temperature and 3.04 g. of 17α-methyldihydrotestosterone is added thereto. The reaction mixture is then heated at reflux for 2 hrs., cooled to room temperature, and poured into 200 ml. of ice and water mixture. The organic material is collected by extraction with chloroform, the extracts dried, and the solvent distilled, yielding a residue weighing 2.8 g. which is recrystallized from ethanol. This crude product is comprised in part of the desired material as is indicated by the ultraviolet absorption characteristic of the butyrolactonylidene group, $\lambda_{max}$. 235 mμ, ε=1720. The purified product is isolated by column chromatography on alumina with development of the column with benzene-ether. The resulting product exhibits melting point 181–186° C., $\lambda_{max.}$, 240 mμ, ε=7400. The nuclear magnetic resonance spectrum measured as described in Example 2, exhibits resonance frequencies at 334 c.p.s. and 256 c.p.s. with an integration ratio of the former to the latter of 0.25/20, indicative of a product comprised of 75% of 3-(γ-butyrolacton-α-ylidene)-17α-methylandrost-17β-ol and 25% of the Δ² or Δ³ endocyclic unsaturated isomer thereof.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A steroid product having the formula

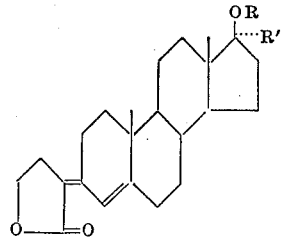

wherein R is selected from the group consisting of hydrogen and a lower alkanoyl group having up to about six carbon atoms and R' is selected from the group consisting of hydrogen and methyl.

2. 17β-acetoxy-3-(γ-butyrolacton-α-ylidene) androst-4-ene.

3. 17β-caproxy-3-(γ-butyrolacton-α-ylidene) androst-4-ene.

4. 17β-hydroxy-3-(γ-butyrolacton-α-ylidene) androst-4-ene.

5. 17β-acetoxy-3-(γ - butyrolacton - α - ylidene) - 17α-methylandrost-4-ene.

6. A steroid product having the formula

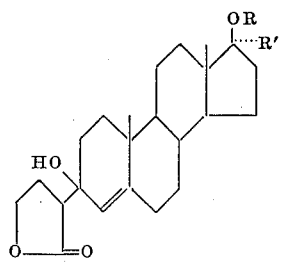

wherein R is selected from the group consisting of hydrogen and lower alkanoyl having up to about six carbon atoms and R' is selected from the group consisting of hydrogen and methyl.

7. 17β-acetoxy-3-(γ-butyrolacton-α-yl) androst - 4 - en-3-ol.

8. 3-(γ-butyrolacton-α-yl) cholestan-3-ol.

9. 3-(γ-butyrolacton-α-ylidene) cholestane.

10. 3-(γ-butyrolacton-α-ylidene) pregn-4-en-20-one.

11. 17-(γ-butyrolacton - α - yl) androst-5-en-3β-17-diol 3β-acetate.

12. 17-(γ-butyrolacton-α-yl) androst-5-en-3β, 17-diol.

13. 3β-acetoxy-20-(γ-butyrolacton - α - yl) pregn-5,16-diene-20-ol.

14. 3-(γ-butyrolacton-α-ylidene)-17α-hyrdoxy-11 - dehydrocorticosterone-21-acetate.

15. A steroid product having the formula

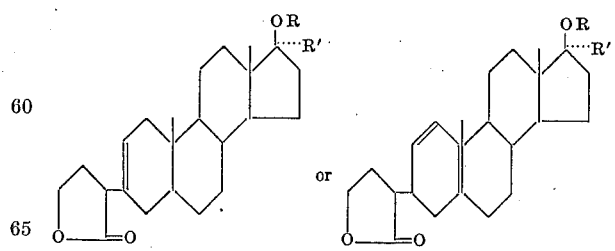

wherin R is hydrogen or a lower alkanoyl of up to about 6 carbon atoms, and R' is hydrogen or methyl.

16. The compound of claim 15 wherein R is acetyl and R' is methyl.

17. The compound of claim 15 wherein R is hydrogen and R' is methyl.

18. 3-(γ-butyrolacton-α-yl) cholest-2-ene.

19. 3-(γ-butyrolacton-α-ylidene) -17α-methylandrostan-17β-ol.

20. The process for the preparation of a steroid compound having the same formula as that of a ketosteroid having a sterically-free ketone group apart from the oxygen atom thereof containing a functional grouping selected from the class consisting of

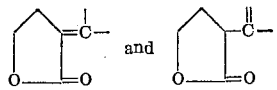

wherein C is that carbon atom of said product which corresponds to the sterically-free ketone group of said ketosteroid which comprises reacting under the conditions of the Wittig reaction at a temperature of about 60–100° C. said ketosteroid and at least about equimolar proportions of a strong base and an α-dilower alkylphosphono-γ-butyrolactone of the formula

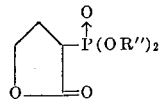

wherein R″ is a lower alkyl group having from one to six carbon atoms.

References Cited by the Examiner
UNITED STATES PATENTS
2,361,968  11/1944  Ruzicka _____ 260—239.5

LEWIS GOTTS, *Primary Examiner.*